United States Patent
Hasegawa et al.

(10) Patent No.: US 8,325,199 B2
(45) Date of Patent: Dec. 4, 2012

(54) IMAGE PROCESSING APPARATUS AND COMPUTER READABLE MEDIUM STORING PROGRAM

(75) Inventors: Noriko Hasegawa, Ebina (JP);
Toshihiro Iwafuchi, Ebina (JP);
Yousuke Tashiro, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 794 days.

(21) Appl. No.: 12/167,660

(22) Filed: Jul. 3, 2008

(65) Prior Publication Data
US 2009/0153580 A1    Jun. 18, 2009

(30) Foreign Application Priority Data
Dec. 12, 2007  (JP) ................................. 2007-320464

(51) Int. Cl.
*G09G 5/02* (2006.01)
(52) U.S. Cl. ........ 345/590; 345/589; 345/591; 345/593; 345/594; 345/604
(58) Field of Classification Search ................... 345/589, 345/590, 591, 593, 594, 604
See application file for complete search history.

(56) References Cited

U.S. PATENT DOCUMENTS

| | | | | |
|---|---|---|---|---|
| 5,311,212 A | * | 5/1994 | Beretta | 345/591 |
| 5,638,117 A | * | 6/1997 | Engeldrum et al. | 348/179 |
| 7,119,760 B2 | * | 10/2006 | Edge et al. | 345/2.1 |
| 7,274,487 B2 | * | 9/2007 | Fukasawa | 358/1.9 |
| 7,328,116 B2 | * | 2/2008 | Bala et al. | 702/107 |
| 7,339,595 B2 | * | 3/2008 | Hilliard et al. | 345/589 |
| 7,880,942 B1 | * | 2/2011 | Phillips et al. | 358/518 |
| 2002/0031256 A1 | | 3/2002 | Hiramatsu et al. | |
| 2006/0250411 A1 | * | 11/2006 | Oh | 345/589 |
| 2008/0204469 A1 | * | 8/2008 | Jaspers | 345/589 |

FOREIGN PATENT DOCUMENTS

| | | |
|---|---|---|
| JP | 09-266538 A | 10/1997 |
| JP | 09-326940 A | 12/1997 |
| JP | 2000-118011 A | 4/2000 |
| JP | 2001-144980 A | 5/2001 |
| JP | 2002-051228 A | 2/2002 |

OTHER PUBLICATIONS

Japanese Office Action dated Jan. 5, 2010 for Japanese Patent Application No. 2007-320464.

* cited by examiner

*Primary Examiner* — Xiao M. Wu
*Assistant Examiner* — Todd Buttram
(74) *Attorney, Agent, or Firm* — Sughrue Mion, PLLC

(57) ABSTRACT

An image processing apparatus includes a characteristics acquisition unit that acquires some of color reproduction characteristics of additive color mixing applied in a display; and a transform method determination unit that determines a transform method from one color gamut of an input color space to another color gamut used by an output device, based on the color reproduction characteristics acquired by the characteristics acquisition unit.

15 Claims, 11 Drawing Sheets

IMAGE PROCESSING PROGRAM 30 g:  (R,G,B)=(A,A,A)
a-f: COLORS MODIFIED BY VALUE MODIFICATION BY $\alpha$ OF ONE OR MORE COLOR COMPONENTS OF g
a'-f': COLORS MODIFIED BY VALUE MODIFICATION BY $\beta$ OF ONE OR MORE COLOR COMPONENTS OF g ($\alpha < \beta$)

a1–a7: R=G=B
b1–b7: COLORS MODIFIED BY VALUE MODIFICATION BY CERTAIN VALUE OF ONE OR MORE COLOR COMPONENTS OF a1–a7

COMPLEMENTARY COLOR a' OF a

COMPLEMENTARY COLOR b' Of b

COMPLEMENTARY COLOR c' OF c

○→● TRANSFORMATION OF DATA INCLUDING DATA A
○→○ TRANSFORMATION OF DATA INCLUDING DATA B

IMAGE PROCESSING APPARATUS AND COMPUTER READABLE MEDIUM STORING PROGRAM

CROSS-REFERENCE TO RELATED APPLICATIONS

This application is based on and claims priority under 35 USC 119 from Japanese Patent Application No. 2007-320464 filed Dec. 12, 2007.

BACKGROUND

1. Technical Field

The present invention relates to an image processing apparatus and a computer readable medium storing a program.

2. Related Art

It has heretofore been known that a color impression of a color image visualized on an input device such as a monitor may differ from a color impression of the same color image reproduced by an output device such as a printer. This is because the input color gamut differs from the output color gamut. Therefore, in general, countermeasures such as changing an ICC profile of the monitor are taken.

SUMMARY

According to an aspect of the invention, there is provided an image processing apparatus including a characteristics acquisition unit that acquires some of color reproduction characteristics of additive color mixing applied in a display; and a transform method determination unit that determines a transform method from one color gamut of an input color space to another color gamut used by an output device, based on the color reproduction characteristics acquired by the characteristics acquisition unit.

BRIEF DESCRIPTION OF THE DRAWINGS

Exemplary embodiments of the present invention will be described in detail based on the following figures, wherein.

DETAILED DESCRIPTION

To begin with, an image processing apparatus 10 according to a first exemplary embodiment of the invention is described.

Figure 1:
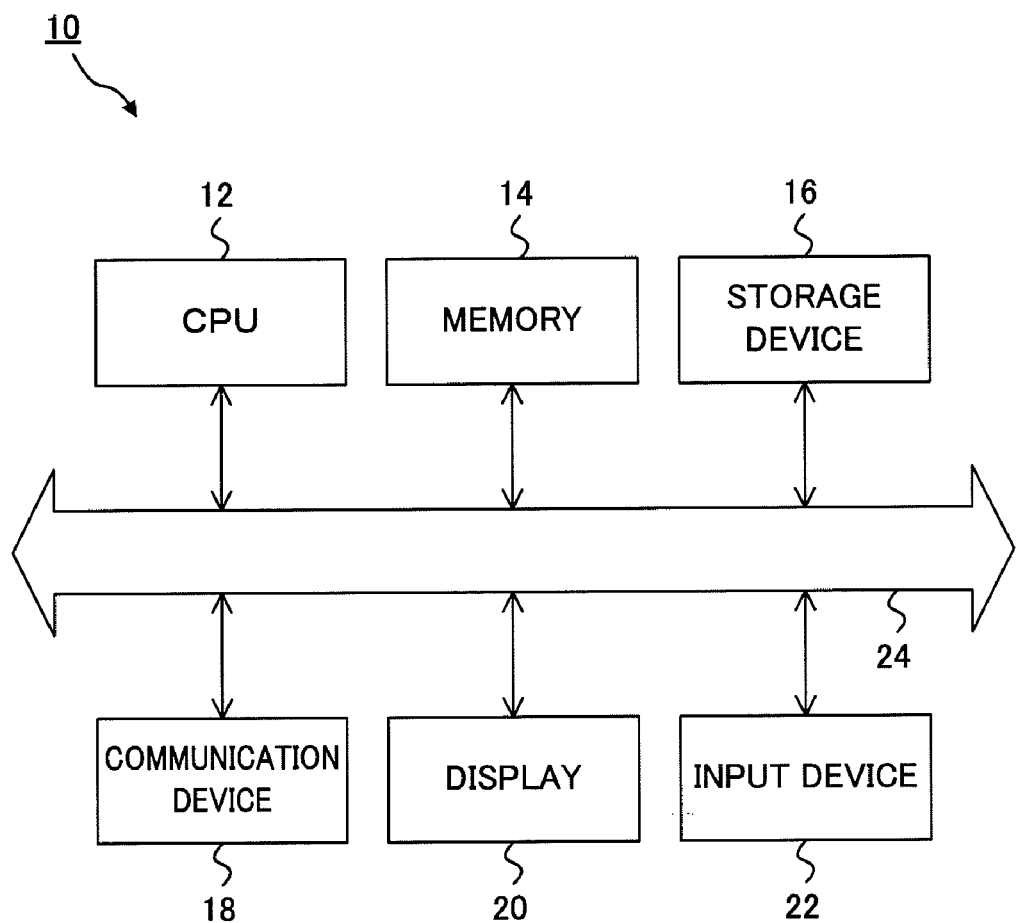
FIG. 1 illustrates a hardware structure of an image processing apparatus 10 according to a first exemplary embodiment of the invention.

FIG. 1 illustrates a hardware structure of the image processing apparatus 10 according to the first exemplary embodiment.

As illustrated in FIG. 1, the image processing apparatus 10 includes a CPU 12, a memory 14, a storage device 16 such as a hard disc drive, a communication device 18 for data communication with a remote computer (not shown) via a network, a display 20 such as a liquid crystal display, and an input device 22 including a keyboard and a mouse. These components are interconnected via a system bus 24.

Figure 2:
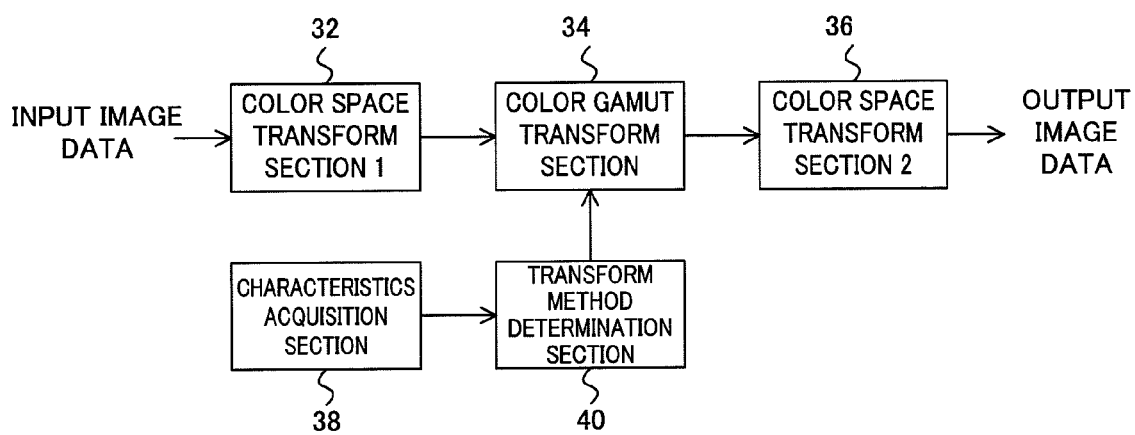
FIG. 2 is a block diagram illustrating the structure of an image processing program 30 running on the image processing apparatus 10 according to the first exemplary embodiment.

FIG. 2 is a block diagram illustrating the structure of an image processing program 30 running on the image processing apparatus 10 according to the first exemplary embodiment.

As illustrated in FIG. 2, the image processing program 30 includes a first color space transform section 32, a color gamut transform section 34, a second color space transform section 36, a characteristics acquisition section 38, and a transform method determination section 40. The image processing program 30 is loaded into the memory 14 of the image processing apparatus 10 and executed by the CPU 12. All or some of the functions of the image processing program 30 may be implemented by hardware provided in the image processing apparatus 10.

In the image processing program 30, the first color space transform section 32 acquires input image data by reading image data stored in the storage device 16 or receiving image data transmitted from a remote computer via the communication device 18. The input image data is defined in a color space in which additive colors are mixed (for example, sRGB color space) and each pixel is expressed by eight bits for each of the RGB components. The first color space transform section 32 transforms the input image data into image data in a device-independent color space, using a predefined profile and outputs the resulting image data to the color gamut transform section 34. For example, the first color space transform section 32 transforms the input image data into calorimetric values in a CIELAB (L*, a*, b*) color space.

The color gamut transform section 34 transforms the image data from one color gamut of the input color space to another color gamut used by an output device, using a transform method determined by the transform method determination section 40 which will be described later. A color gamut represents the range of colors (color range) reproducible by a display or an output device. A transform method is implemented by a compressive mapping function. The color gamut transform section 34 outputs the transformed image data in the color gamut used by the output device to the second color space transform section 36.

The second color space transform section 36 receives the transformed image data in the color gamut used by the output device from the color gamut transform section 34, transforms this image data into image data in a CMYK color space of a color system for printing, and outputs it as output image data.

Thus, the first color space transform section 32, the color gamut transform section 34, and the second color space transform section 36 constitute a color transform unit that performs color transformation of input image data from one color space in which additive colors are mixed to another color space in which subtractive colors are mixed, using a transform method determined by the transform method determination section 40. The first color space transform section 32 and the second color space transform section 36 may perform color space transform processing, using a color lookup table (LUT) which is prestored.

The characteristics acquisition section 38 acquires some of color reproduction characteristics of additive color mixing applied in the display 20 and outputs them to the transform method determination section 40. For example, the characteristics acquisition section 38 acquires achromatic color region characteristics as some of color reproduction characteristics of additive color mixing. More specifically, the characteristics acquisition section 38 displays a color (achromatic color) made by mixing plural color components (e.g., RGB) in equal quantities and colors modified by value modification of at least one of the color components of the achromatic color on the display 20. The characteristics acquisition section 38 acquires color information perceived as the achromatic color and selected by a user from among these colors and calculates a deviation of the selected color information relative to the achromatic color. A method of acquiring characteristics of additive color mixing will be detailed later.

The transform method determination section 40 determines a transform method from the color gamut of the input color space to the color gamut used by the output device, based on the color reproduction characteristics acquired by the characteristics acquisition section 38. In particular, the transform method determination section 40 determines color transform coefficients according to the amount of deviation from the achromatic color obtained as the color reproduction characteristic. Then, it generates and outputs a compressive mapping function including these color transform coefficients to the color gamut transform section 34. A method of determining a transform method will be detailed later.

Figure 3:
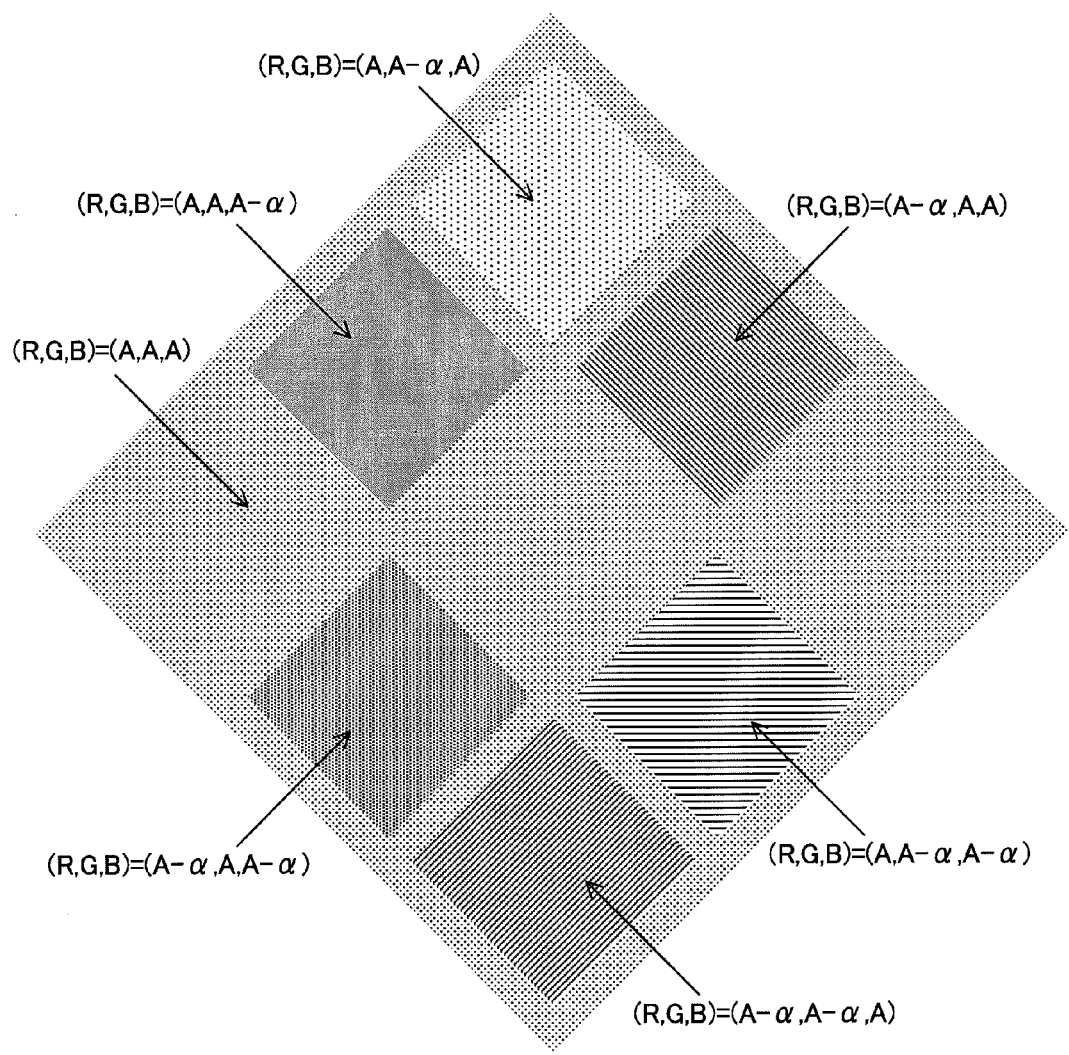
FIG. 3 illustrates in detail a method of acquiring characteristics of additive color mixing by a characteristics acquisition section 38.

FIG. 3 illustrates in detail the method of acquiring characteristics of additive color mixing by the characteristics acquisition section 38.

As illustrated in FIG. 3, the characteristics acquisition section 38 of the image processing program 30 displays an achromatic color and plural colors (for comparison) modified by value modification of at least one of the color components of the achromatic color on the display 20.

For example, the achromatic color is produced by mixing RGB color components, each having a predefined value A (R=G=B), and the colors for comparison are those modified by a value modification by α(A−a) of one or two color components of the achromatic color. In the present exemplary embodiment, six colors for comparison are displayed as foreground colors on the display 20 and the achromatic color is displayed as the background color of the colors for comparison.

A user clicks a color region perceived as the achromatic color using the input device 22 such as a mouse and inputs a user decision that the user perceived the color as the achromatic color. The characteristics acquisition section 38 of the image processing program 30 accepts the input and acquires color information selected by the user. Thus, the characteristics acquisition section 38 acquires color reproduction characteristics from color information corresponding to the achromatic color and color information corresponding to a color for comparison selected as the achromatic color.

In particular, if the selection is made of an achromatic color region by the user, the characteristics acquisition section 38 determines that the display 20 maintains the color balance of the color reproduction characteristics. If the selection is made of a color region modified by the value modification of one color component of the RGB is selected, the characteristics acquisition section 38 determines that an offset in the direction of the corresponding color component occurs in additive color mixing. If the selection is made of a color modified by the value modification of two color components of the RGB, the characteristics acquisition section 38 determines that an offset in the corresponding two color components occurs in the additive color mixing.

That is, the characteristics acquisition section 38 compares the color components of selected color information with the color components of the achromatic color and analyzes the difference (offset) of the former color components from the latter color components. Thus, a compressive mapping function is selected by the transform method determination section 40 to compensate for the offset.

Figure 4A:
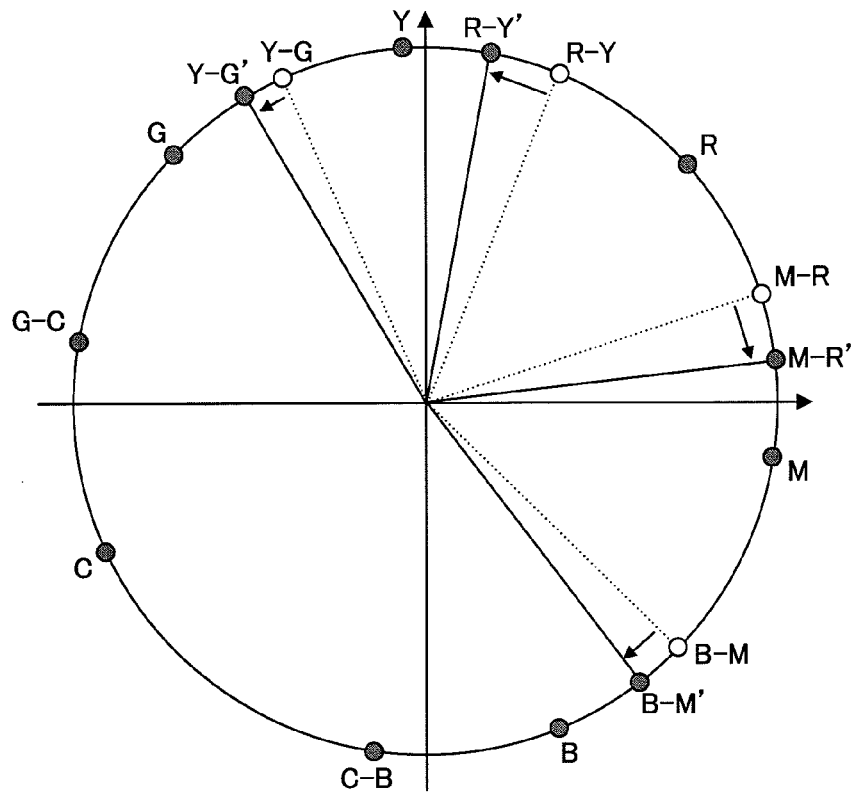
FIGS. 4A and 4B illustrate in detail a method of determining a transform method by a transform method determination section 40.
Figure 4B:
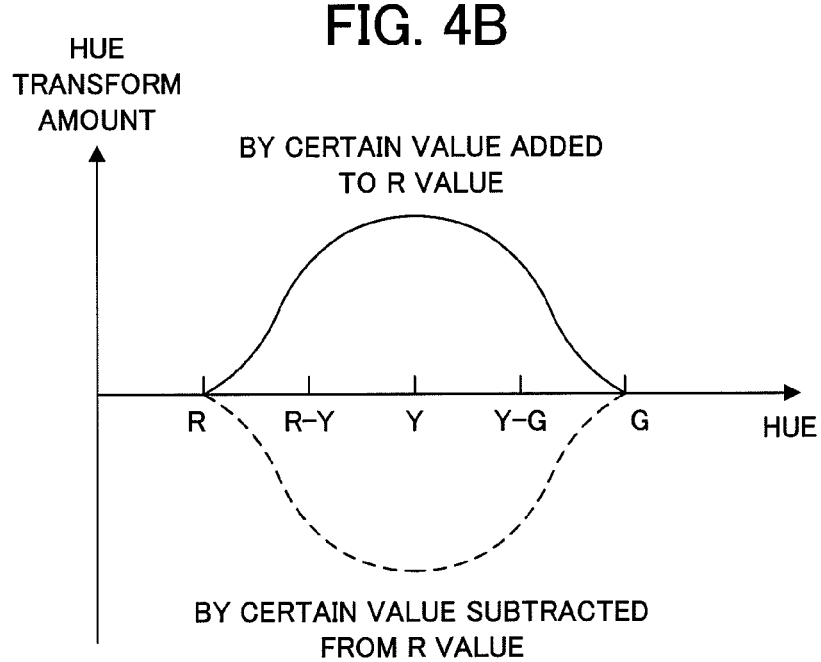

FIGS. 4A and 4B illustrate in detail the method of determining a transform method by the transform method determination section 40.

FIG. 4A illustrates hue transformation. As illustrated in FIG. 4A, the transform method determination section 40 of the image processing program 30 determines a transform method for hue transformation relative to a color component that is calculated according to the color information acquired by the characteristics acquisition section 38 and based on a complementary color of the color component. That is, when characteristics of additive color mixing are acquired, a color modified by a value modification of one or two color components of the RGB is selected, the transform method determination section 40 defines hue transformation according to the offset relative to the color component(s). In the following, the color information acquired by the characteristics acquisition section 38 will also be referred to as an offset point in additive color mixing.

For example, if the offset point in additive color mixing is a color modified by a value modification of only the R component from the achromatic color image data, that is, the color is selected by the user, hue transformation relative to R is performed. In this case, a segment from R to G and a segment from R to B are subject to hue transformation and a transform method in which the hue of these segments is transformed toward the direction of a C segment that is the complementary color of R is determined. However, C (cyan) is not transformed because of its relationship as the complementary color to the R component. Pure color segments of Y (yellow), M (magenta), and cyan (C) are not subject to hue transformation.

FIG. 4B is a graph showing a relationship between hue and hue transform amount. As shown in FIG. 4B, the transform method determination section 40 determines a transform method so that the hue transform amount becomes smaller for colors closer to the primary colors (R, G, B) of the input color space. If the offset point in additive color mixing is a color modified by a certain value added to the R component value of the achromatic color image data, a positive variation of hue occurs. If the selected color is a color modified by a certain value subtracted from the R component value of the achromatic color image data, a negative variation occurs.

In this way, the transform method determination section 40 determines how the hue should vary in which direction and generates a compressive mapping function reflecting this variation.

Figure 5:
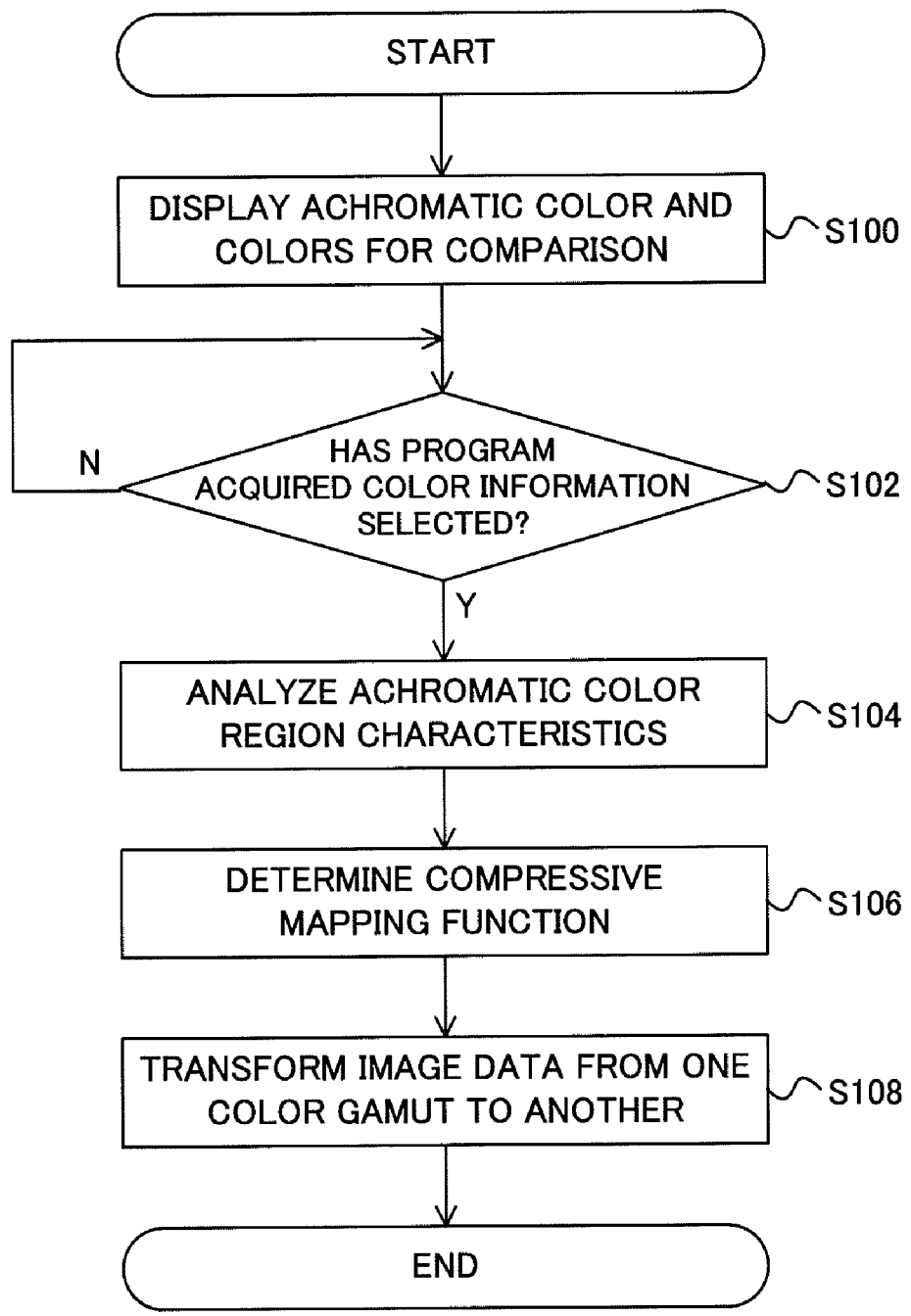
FIG. 5 shows a flowchart of image processing (S10) that is performed by the image processing apparatus 10 according to an exemplary embodiment of the invention.

FIG. 5 shows a flowchart of image processing (S10) that is performed by the image processing apparatus 10 according to an exemplary embodiment of the invention.

As shown in FIG. 5, at step 100 (S100), the characteristics acquisition section 38 of the image processing program 30 running on the image processing apparatus 10 displays an achromatic color and colors for comparison on the display 20. When the user selects an achromatic color perceived from among the displayed colors and specifies that color region using the input device 22. For example, the user clicks the color region with the mouse.

At step 102 (S102), the characteristics acquisition section 38 determines whether it has acquired color information selected by the user. If the characteristics acquisition section 38 has acquired color information, the process goes to step S104; otherwise, the process returns to step S102.

At step 104 (S104), the characteristics acquisition section 38 calculates an offset of selected color information from the achromatic color and acquires the achromatic color region characteristics. More specifically, the characteristics acquisition section 38 analyzes in the selected color information the offset of a color component whose value differs from the achromatic color.

At step 106 (S106), the transform method determination section 40 of the image processing program 30 determines a compressive mapping function based on the acquired characteristics. The determined compressive mapping function is stored into at least one of the memory 14 and the storage device 16.

At step 108 (S108), the color gamut transform section 34 of the image processing program 30 transforms image data from one color gamut to another, using the compressive mapping function determined by the transform method determination section 40. In particular, the color gamut transform section 34 transforms the image data generated by color space change on input image data (RGB) by the first color space transform section 32 from one color gamut to another and outputs the transformed image data to the second color space transform section 36. This image data is transformed into output image data in, for example, a CMYK color space suitable for printing and output by the second color space transform section 36.

In this way, characteristics of additive color mixing are acquired, a compressive mapping function is determined, and this compressive mapping function is used for color transformation from one color gamut to another. Consequently, achromatic color characteristics are corrected and, therefore, a color impression perceived by the eye on the display 20 can be reproduced by an output device such as a printer.

Then, alternative examples of the method of acquiring characteristics of additive color mixing are described using FIGS. 6 through 9B.

Figure 6:
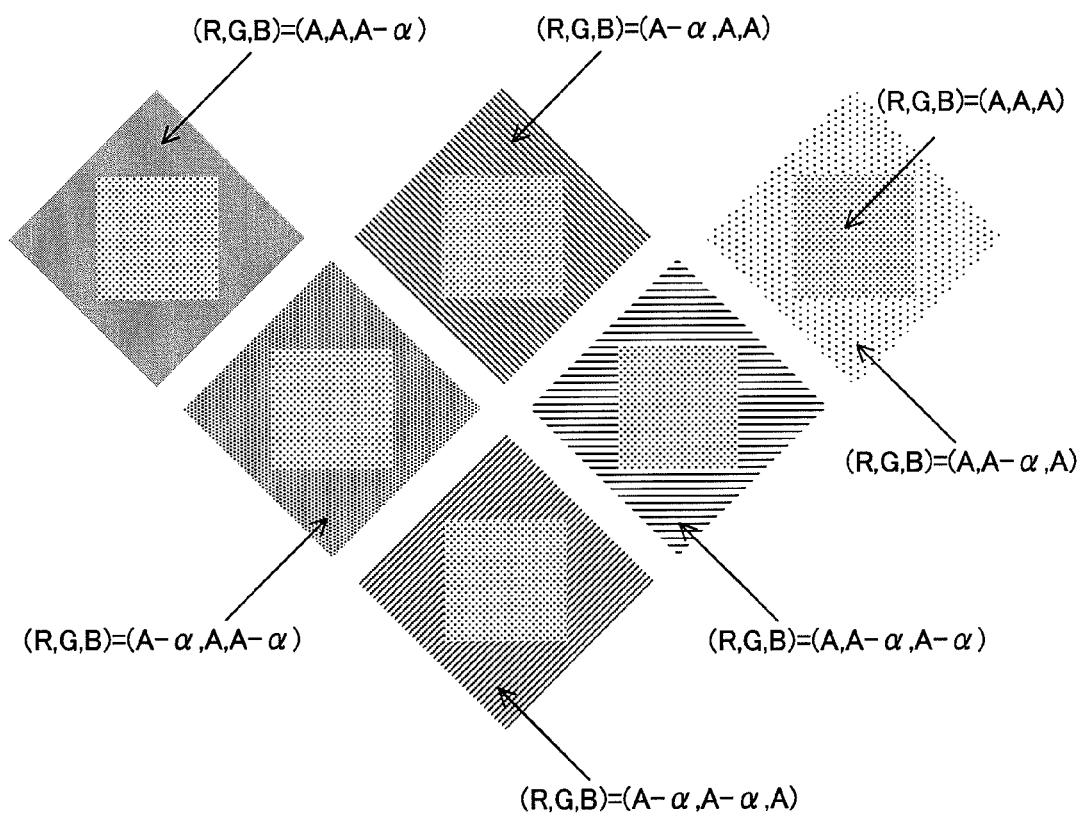
FIG. 6 illustrates a second example of the method of acquiring characteristics of additive color mixing by the characteristics acquisition section 38.

FIG. 6 illustrates a second example of the method of acquiring characteristics of additive color mixing by the characteristics acquisition section 38.

In the present example, as illustrated in FIG. 6, colors for comparison are displayed as background colors of an achromatic color and the achromatic color is displayed as the foreground color inside the regions of the colors for comparison. The pixel values of the achromatic color and those of the colors for comparison are the same as in the first example. Thus, from the achromatic color regions and the regions of the colors for comparison, the user specifies a color region perceived as the achromatic color using the input device 22.

Figure 7A:
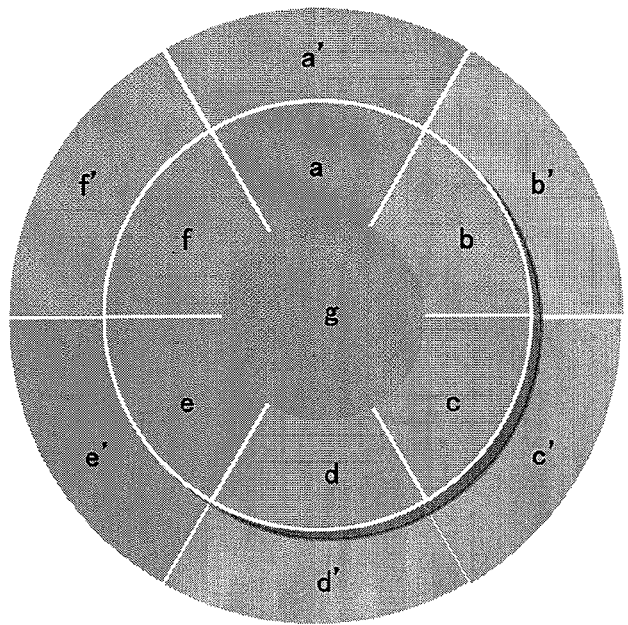
FIGS. 7A and 7B illustrate a third example of the method of acquiring characteristics of additive color mixing by the characteristics acquisition section 38.
Figure 7B:
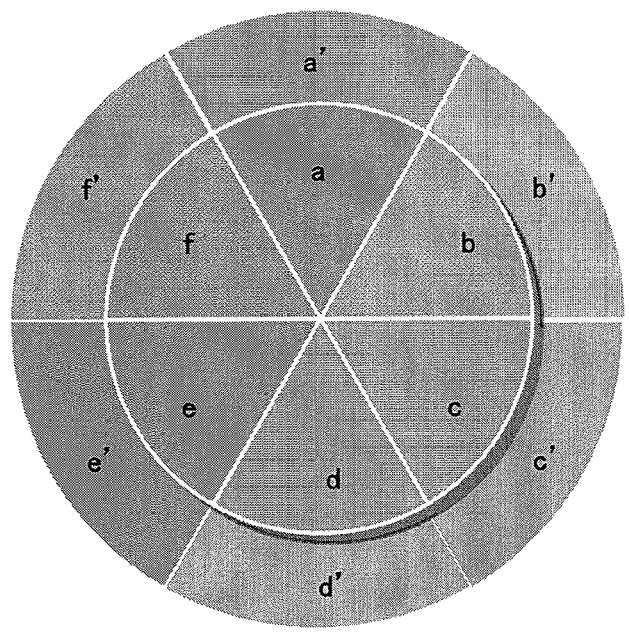

FIGS. 7A and 7B illustrate a third example of the method of acquiring characteristics of additive color mixing by the characteristics acquisition section 38.

In the present example, as illustrated in FIG. 7A, an achromatic color g is displayed in the center and colors for comparison a-f and a'-f' are displayed around the achromatic color g. Here, the achromatic color g is a color whose component colors are in equal quantities, R=G=B, the colors for comparison a-f are those modified by a value modification by α of at least one of the color components of the achromatic color, and the colors for comparison a'-f' are those modified by a value modification by $\beta(\beta>\alpha)$ of at least one of the color components of the achromatic color.

More specifically, the colors for comparison a-f are disposed in segments disposed in the hue direction in the periphery of the achromatic color g. The colors for comparison a'-f' are displayed in segments disposed in the hue direction in the concentric periphery of the segments of the colors for comparison a-f.

Alternatively, as illustrated in FIG. 7B, the characteristics acquisition section 38 of the image processing program 30 displays plural colors for comparison on the display 20. In this way, the achromatic color g may not be displayed. In this case, the user specifies a color region perceived as the achromatic color from the regions of the displayed colors for comparison a-f and a'-f'.

Figure 8:
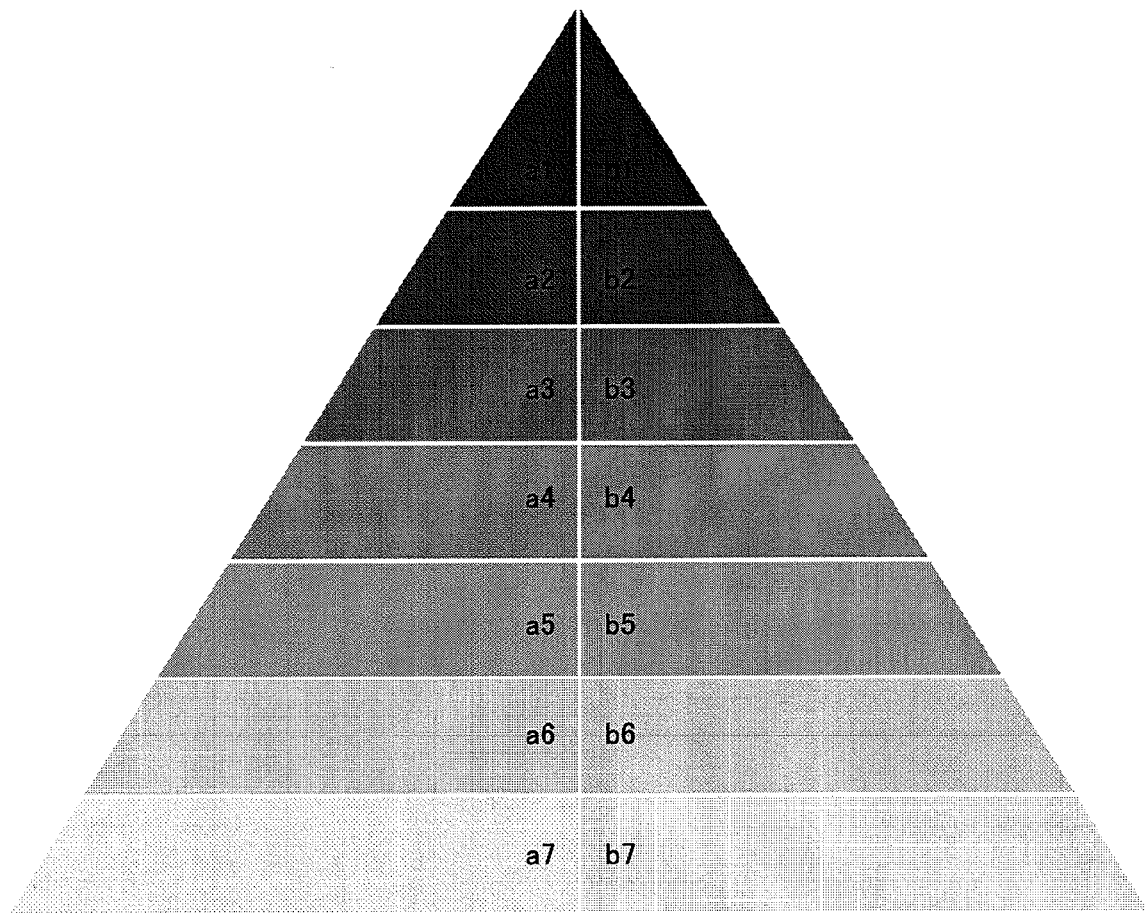
FIG. 8 illustrates a fourth example of the method of acquiring characteristics of additive color mixing by the characteristics acquisition section 38.

FIG. 8 illustrates a fourth example of the method of acquiring characteristics of additive color mixing by the characteristics acquisition section 38.

As illustrated in FIG. 8, the characteristics acquisition section 38 of the image processing program 30 displays plural achromatic colors and colors modified by value modification of at least one of the color components of the achromatic colors on the display 20. In the present example, the achromatic colors a1 to aN (N=7 in this example) with respective plural densities and the colors for comparison b1 to bN corresponding to the achromatic colors with the respective densities are displayed. Here, the achromatic colors a1 to a7 are those whose component colors are in equal quantities, R=G=B, wherein the achromatic color a1 has the highest density; the larger the value of N is, the lower the density will be. The lower the density is, the larger will be the area where the color is displayed. The colors for comparison b1 to b7 are those modified by value modification by a certain value in the range from a to β of at least one of the color components of the corresponding achromatic colors a1 to a7.

The user specifies the region of a color perceived as the achromatic color from the regions of the displayed colors. Thus, if the region of a color for comparison is perceived as the achromatic color by the user, the image processing apparatus 10 acquires the achromatic color region characteristics based on the color components of this color for comparison and the color components of the achromatic color corresponding to the color for comparison.

Figure 9A:
FIGS. 9A and 9B illustrate a fifth example of the method of acquiring characteristics of additive color mixing by the characteristics acquisition section 38.
Figure 9A:
Figure 9A:
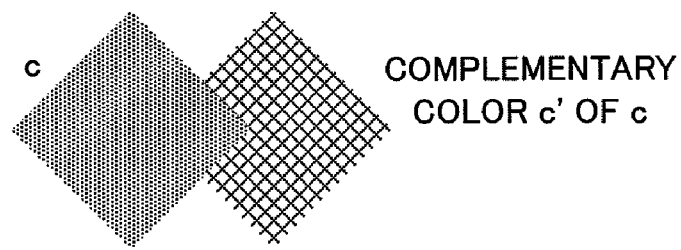
Figure 9B:
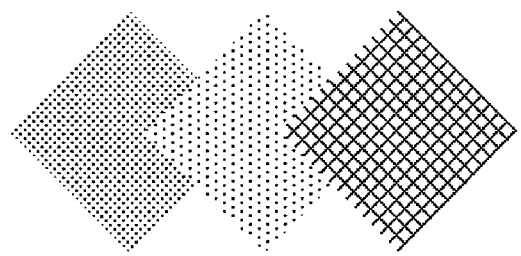

FIGS. 9A and 9B illustrate a fifth example of the method of acquiring characteristics of additive color mixing by the characteristics acquisition section 38.

As illustrated in FIG. 9A, the characteristics acquisition section 38 of the image processing program 30 displays plural colors for comparison and complementary colors of the colors for comparison on the display 20. In the present example, the colors for comparison a-c and complementary colors a'-c' of the colors for comparison a-c are displayed. Here, the colors for comparison a-c are those modified by a value modification by β of at least one of the color components of an achromatic color. For each of the pairs of the plural colors for comparison and their complementary colors, the user perceives which of the pair is closer to the achromatic color and specifies the region of the color perceived as the achromatic color.

When the image processing apparatus 10 accepts the input, selected plural colors are displayed as illustrated in FIG. 9B. Among the displayed plural colors, thus, the user perceives a color that is the closest to the achromatic color and specifies the region of the color. The image processing apparatus 10 acquired the achromatic color region characteristics based on the selected color and the achromatic color corresponding to that color.

Achromatic colors corresponding to the colors for comparison may be displayed together with the colors for comparison and their complementary colors. In this case, from among the achromatic colors, the colors for comparison, and their complementary colors, the user selects a color perceived as the achromatic color.

Then, another example of the method of determining a transform method is described.

In the present example, a transform method is determined based on acquired color information and achromatic color information in a device-independent color space. More specifically, a transform method is determined based on color information on a color perceived as the achromatic color by the user and color information defined to be a*=b*=0 in a Lab color system.

Figure 10A:
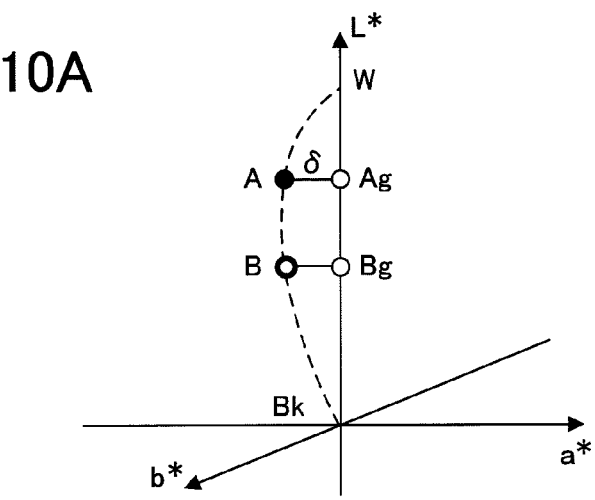
FIGS. 10A through 10C illustrate another example of the method of determining a transform method by the transform method determination section 40.
Figure 10B:
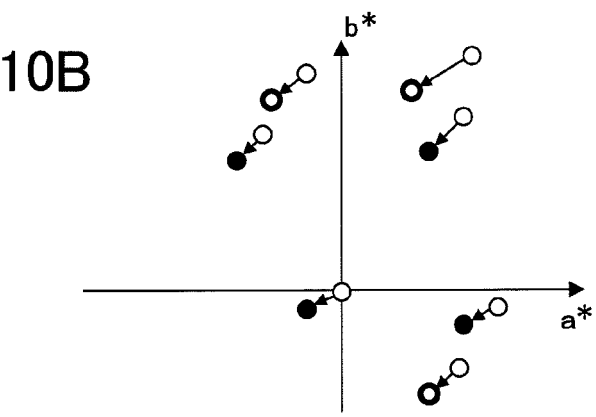
Figure 10C:
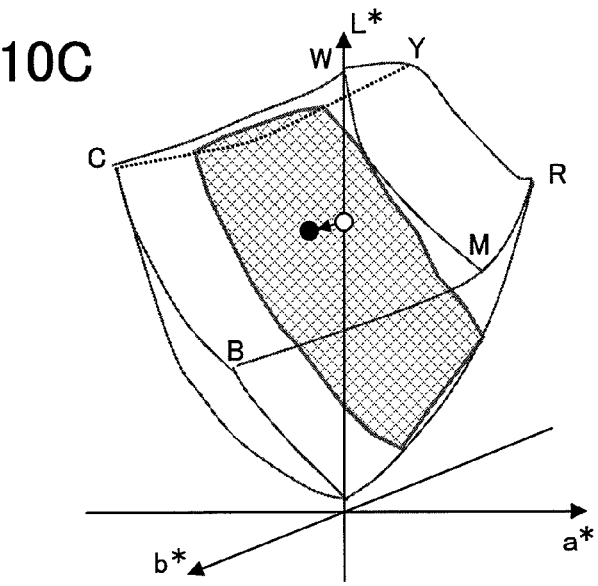

FIGS. 10A through 10C illustrate another example of the method of determining a transform method by the transform method determination section 40.

FIG. 10A illustrates plotting color information A, B perceived as achromatic colors and achromatic colors Ag, Bg corresponding to each piece of color information in the Lab color system. For example, each of color information pieces A, B is a color modified by value modification of only the R component from the achromatic color image data, where the R component of color information A is 128 and the R component of color information B is 100. The achromatic colors Ag, Bg are color information defined to be a*=b*=0, where each of colors A, B has an equal value of L*.

As illustrated in FIG. 10A, a transform amount δ is calculated based on the offsets of each of color information pieces A, B from the achromatic color Ag, Bg. Here, the transform amount of white and black are approximately 0. Hence, the transform amount δ is plotted by a dotted line in the figure.

FIG. 10B illustrates plotting color information on the a*b* plane. As illustrated in FIG. 10B, for color information including data A (where the R color component is 128), this color information is transformed by the transform amount δ for A. Likewise, for color information including data B (where the R color component is 100), this color information is transformed by the transform amount for B.

FIG. 10C illustrates color information transformation in the Lab color system. In FIG. 10C, a hatched plane has an offset point in additive color mixing. For example, on this plane, color information including data A (R=128) is plotted. In the present example, as illustrated in FIG. 10C, this plane is subdivided into meshes and transform characteristics illustrated in FIG. 10B are set in each of grid points of the meshes. That is, a compressive mapping function is determined in each grid point. Using the thus determined compressive mapping function, the image processing apparatus 10 performs color transformation from one color gamut to another.

Next, an image processing apparatus 10 according to a second exemplary embodiment of the invention is described.

The image processing apparatus 10 according to the second exemplary embodiment differs from the image processing apparatus 10 of the first exemplary embodiment in that color reproduction characteristics of additive color mixing are acquired based on a profile of the input device such as the display 20. The profile is a file that describes the color reproduction characteristics of a device such as the display 20 and provided, for example, in an ICC profile format defined by the ICC (International Color Consortium).

More specifically, the characteristics acquisition section 38 of the image processing program 30 acquires color information to be corrected from a result of comparison between the profile of the input device and a prescribed profile (for example, a profile of a standard monitor). The comparison is made, for example, in terms of hue, chroma, etc.

Figure 11:
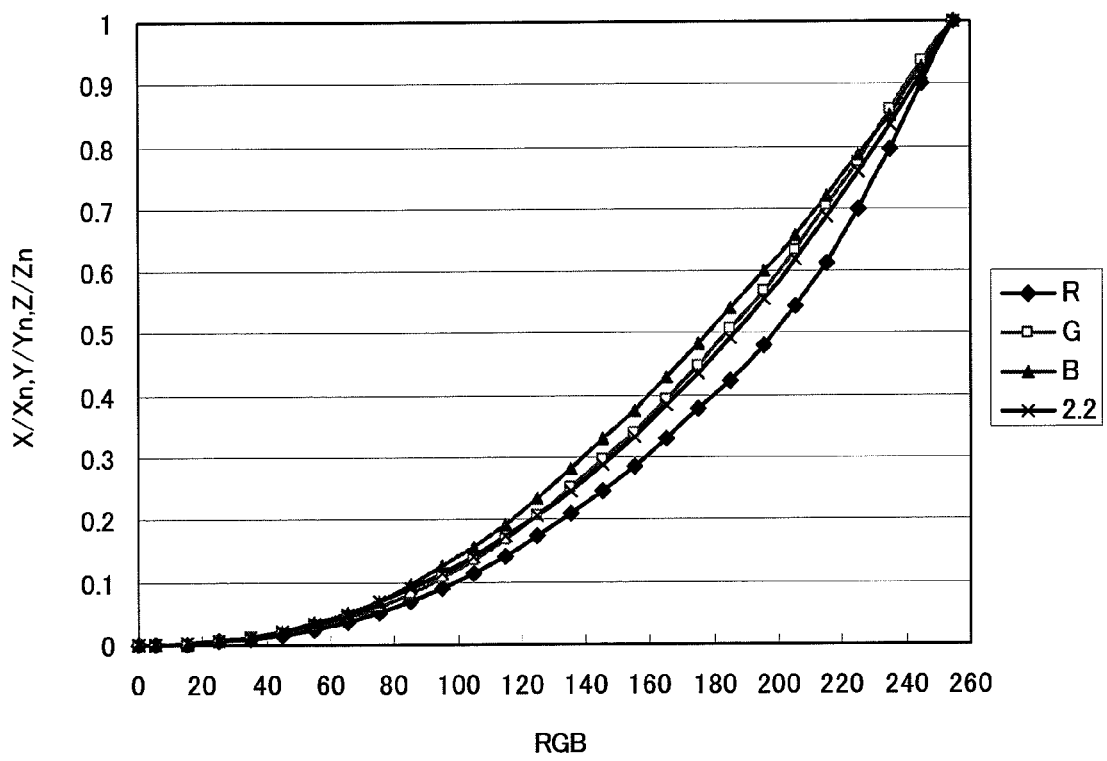
FIG. 11 is a graph showing an example of a tone curve analyzed based on a profile.

FIG. 11 is a graph showing an example of a tone curve analyzed based on a profile.

As shown in FIG. 11, as a result of analysis of the profile of the input device, a curve of the R component may deviate from a curve of γ=2.2, whereas the curves of the G and B components generally conform to the curve of γ=2.2.

In this case, the characteristics acquisition section 38 of the image processing program 30 acquires an offset characteristic curve of the R component. In this way, by analyzing the profile, the image processing apparatus 10 acquires a color component deviating from the achromatic color and its offsets.

The present invention may be embodied in other specific forms without departing from its spirit or characteristics. The described exemplary embodiments are to be considered in all respects only as illustrated and not restrictive. The scope of the invention is, therefore, indicated by the appended claims rather than by the foregoing description. All changes that come within the meaning and range of equivalency of the claims are to be embraced within their scope.

What is claimed is:

1. An image processing apparatus comprising:
a characteristics acquisition unit that acquires perceived achromatic color region characteristics of additive color mixing applied in a display; and
a transform method determination unit that determines a transform method from one color gamut of an input color space to another color gamut used by an output device, based on the color reproduction characteristics acquired by the characteristics acquisition unit,
wherein the characteristics acquisition unit displays a first color made by mixing a plurality of color components in equal quantities and additional colors modified by value modification of at least one of the color components of the first color on the display and acquires color information selected from the thus displayed first color and additional colors, and
wherein the transform method determination unit determines a transform method for hue transformation relative to an offset point in mixing additive primary colors that is calculated according to the color information acquired by the characteristics acquisition unit and toward a direction of the complementary color of the offset point in mixing additive primary colors.

2. The image processing apparatus according to claim 1, wherein the characteristics acquisition unit displays a plurality of colors modified by value modification of at least one of the color components of a color made by mixing the color components in equal quantities on the display and acquires color information selected from the thus displayed colors.

3. The image processing apparatus according to claim 1, wherein the characteristics acquisition unit displays a plurality of colors made by mixing a plurality of color components in equal quantities and colors modified by value modification of at least one of the color components of the colors on the display and acquires color information selected from the thus displayed colors.

4. The image processing apparatus according to claim 1, wherein the characteristics acquisition unit displays colors modified by value modification of at least one of the color components of a color made by mixing the color components in equal quantities and complementary colors of the colors on the display and acquires color information selected from the thus displayed colors.

5. The image processing apparatus according to claim 1, wherein the characteristics acquisition unit acquires color information to be corrected from a result of comparison between a profile of an input device and a prescribed profile.

6. The image processing apparatus according to claim 5, wherein the transform method determination unit determines a transform method for hue transformation relative to a color component that is calculated according to the color information acquired by the characteristics acquisition unit and based on a complementary color of the color component.

7. The image processing apparatus according to claim 1, wherein the transform method determination unit makes the hue transform amount smaller for colors closer to primary colors next to the offset point in mixing additive primary colors in the input color space.

8. The image processing apparatus according to claim 6, wherein the transform method determination unit makes the hue transform amount smaller for colors closer to primary colors next to the offset point in mixing additive primary colors in the input color space.

9. The image processing apparatus according to claim 1, wherein the transform method determination unit determines a transform method, based on color information acquired by the characteristics acquisition unit and achromatic color information in a device-independent color space.

10. The image processing apparatus according to claim 5, wherein the transform method determination unit determines a transform method, based on color information acquired by the characteristics acquisition unit and achromatic color information in a device-independent color space.

11. The image processing apparatus according to claim 1, wherein the transform method determination unit determines color transform coefficients for color transformation from the input color space to the output color space.

12. The image processing apparatus according to claim 1, wherein further a color transform unit that performs color transformation of input image data from one color space in which additive colors are mixed to another color space in which subtractive colors are mixed, using the transform method determined by the transform method determination section.

13. The image processing apparatus according to claim 1, wherein the characteristics acquisition unit acquires the perceived achromatic color region characteristics by displaying an achromatic color on the display, acquiring color information perceived as the achromatic color and selected by a user from among colors comprising the achromatic color, and calculating a deviation of the selected color information relative to the achromatic color.

14. In an image processing apparatus including a computer, a non-transitory computer readable medium storing a program including instructions causing the computer of the image processing apparatus to perform a process comprising:
acquiring perceived achromatic color region characteristics of additive color mixing applied in a display; and
determining a transform method from one color gamut of an input color space to another color gamut used by an output device, based on the color reproduction characteristics acquired,
wherein the acquiring some of color reproduction characteristics comprises displaying a first color made by mixing a plurality of color components in equal quantities and additional colors modified by value modification of at least one of the color components of the first color on the display and acquiring color information selected from the thus displayed first color and additional colors, and
wherein the transform method determination unit determines a transform method for hue transformation relative to an offset point in mixing additive primary colors that is calculated according to the color information acquired by the characteristics acquisition unit and toward a direction of the complementary color of the offset point in mixing additive primary colors.

15. An image processing method comprising:
acquiring perceived achromatic color region characteristics of additive color mixing applied in a display; and
determining, using a processor, a transform method from one color gamut of an input color space to another color gamut used by an output device, based on the color reproduction characteristics acquired by the characteristics acquisition unit,
wherein the acquiring some of color reproduction characteristics comprises displaying a first color made by mixing a plurality of color components in equal quantities and additional colors modified by value modification of at least one of the color components of the first color on the display and acquiring color information selected from the thus displayed first color and additional colors, and
wherein the transform method determination unit determines a transform method for hue transformation relative to an offset point in mixing additive primary colors that is calculated according to the color information acquired by the characteristics acquisition unit and toward a direction of the complementary color of the offset point in mixing additive primary colors.

* * * * *